Feb. 6, 1934. F. E. RILEY 1,946,236
LUBRICATED VALVE
Filed June 23, 1931
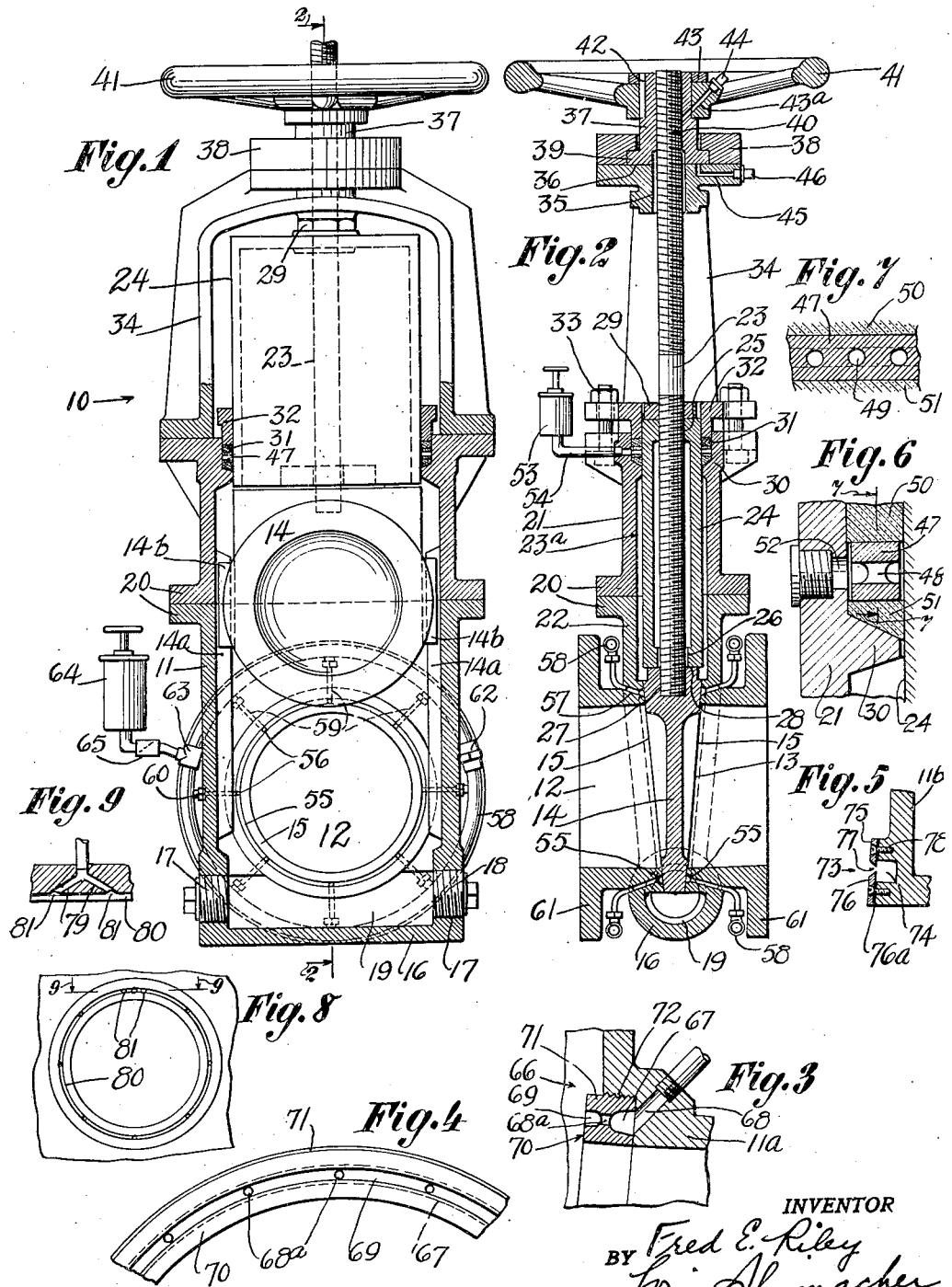
INVENTOR
Fred E. Riley
BY
ATTORNEY Patented Feb. 6, 1934

1,946,236

UNITED STATES PATENT OFFICE 1,946,236

LUBRICATED VALVE

Fred E. Riley, Livermore Falls, Maine

Application June 23, 1931. Serial No. 546,204

3 Claims. (Cl. 251—167)

This invention relates to lubricated valves.

One object of the invention is to provide a lubricated valve, having a wedge shaped gate and improved means for lubricating the same so that the lubricant is efficiently supplied for reducing wear at the seating surface of the gate and to cause a proper closing of the valve.

The valves to which this invention relates are used, for example, in mains for coke oven gas which is generally full of dust and other substances, and also in the transmission of solid materials, such as wood pulp, food products and the like. These materials tend to form a deposit in the valve casing and upon the seating surfaces of the gate so that efficient lubrication thereof is essential.

Another object of the invention, therefore, is to provide a lubricated gate valve having an improved large substantial cleanout in the casing for removal from time to time of accumulated materials or deposits, this cleanout being arranged to afford access to the gate seating of the casing when the valve is open, and, when the valve is closed, removal of the deposit at the bottom of the gate may be effected without leakage.

Other objects of the invention are to provide improved uniform circularly arranged lubrication for the seating surface of the gate, with a plurality of ports and either an internal or external supply for the ports; to provide improved means for continuous lubrication along the seating surface; to provide improved substantially tangential lubricant distributing means for the seating surface; to arrange lubricating means in connection with plane or renewable gate seating members; to provide an improved renewable seat; to provide improved means for lubricating the stem of the valve.

Another object of the invention is to provide a valve having a gate and an operating member therefor, and improved means for lubricating the member; and more particularly a lubricant cage is arranged in improved association with a gate extension.

A further object of this invention is to provide a lubricated valve having relatively few and simple parts, and which is inexpensive to manufacture, assemble, and repair, and which is reliable, durable, and efficient in operation, and wherein the lubricating system may include force feeding and flow direction controlling elements.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawing, wherein like parts are designated by the same reference characters throughout the several views.

In the drawing:

Figure 1 is a view in vertical section of a device embodying the invention.

Fig. 2 is a view in vertical section thereof taken on line 2—2 of Fig. 1.

Fig. 3 is a fragmentary sectional view showing a removable seat and a modified lubricating means.

Fig. 4 is a fragmentary face view thereof.

Fig. 5 is a fragmentary sectional view of a modified removable seat and a lubricating means formed thereby.

Fig. 6 is an enlarged fragmentary vertical sectional view of the lubricant cage.

Fig. 7 is a sectional view taken on line 7—7 of Fig. 6.

Fig. 8 is a fragmentary face view of a modified lubricant feed for the seating surface of the valve.

Fig. 9 is an enlarged transverse sectional view taken on line 9—9 of Fig. 8.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

Although this invention has been shown as embodied in a bonnetless valve, for which certain features thereof are particularly adapted, it will be understood that the invention may also be used in bonnet valves; and although the valve shown is of a gate type, it may also be used with globe type valves, since the valve may be disposed at any desired angle to the stem or direction of movement in opening or closing of the valve.

Referring in detail to the drawing, 10 denotes a device embodying the invention. The same may include any suitable casing 11 having a flow passage 12 extending therethrough. An intersecting passage 13 may be provided for a gate 14. This gate may have one or more seating faces, which may be in any desired relation to each other, but are preferably formed along planes at a small acute angle to each other to constitute the gate a wedge type gate. The passage 13 may have similarly arranged one or more seating faces 15 for engaging the gate to form a tight closure therewith.

To provide a collector for deposits in the valve, the casing 11 may have a bottom extension 16 which communicates with the interior of the main casing, for instance, along the passage 13. In this manner the extension 16 is well adapted to receive deposits of dust or other solids that tend to accumulate on the gate or the walls of the casing or both. The collector extension may have one or more relatively large end openings 17 that may be closed by means such as plugs 18. As these openings are alined, removal of the plugs provides a through collector passage 19 along the gate passage 13 and in continuous communication with the flow passage 12. Hence when the valve 14 is opened, large parts of the interior of the casing 11, and in particular the seating surfaces 15, may be cleaned on insertion of a suitable tool; when the gate is closed, the collector passage may be opened and cleaned without leakage of the valve even though the main in which the valve is connected be under pressure.

Connected to the main casing 11 in any suitable manner, as by means of flanges 20, is an extension 21. The latter, together with the upper portion 22 of the main casing, provides a substantially rectangular chamber 23a which is in alinement with the gate passage.

Connected to the gate 14 is a suitable operating member for opening and closing the same, such as a stem 23, and/or an element 24. The latter, which is of advantage with bonnetless valves, may be denominated an extension of the gate 14. This extension gate may be in the nature of a hollow box structure, with which the stem may coact in any feasible manner. For instance, the extension gate may have an upper threaded opening 25, and a lower alined smooth bored hole 26, through which the stem is passed in succession and screwed into the gate at 27. In this manner the gate extension 24 may be in relatively rigid abutment with the gate at 28, and the screw may be locked against rotation by a nut 29. Washers or the like may be used wherever necessary to constitute these parts a rigid unit. It will be noted that the chamber 23a has sufficient clearance to permit the gate 14 and its extension 24 to be readily moved therethrough in opening and closing the valve, and, in general, the extension may have various sizes relative to the gate, although in length, it must be greater than the distance of travel of the gate. For centrally guiding the movement of the gate and its extension, as a unit, opposite longitudinal guides 14a may be provided in the casing 11 and its extension 21, these guides being received between flanges 14b projecting laterally from the gate.

To close the extension casing 21 in any position of the gate, said extension may be provided with a packing means. For this purpose, a stuffing box portion 30 may be arranged at the upper end of the extension, and in this portion is placed any suitable packing 31, adapted to be compressed by a gland 32, which may be secured by bolts 33. The packing and gland fit snugly around the gate extension 24, and as the latter is of regular shape, a continuous sealing action is afforded.

Mounted on the casing extension 21 is a support such as a yoke 34. The same may have an opening 35 through which the stem 23 freely extends. At the top of this yoke is a seating surface 36 on which rotatably rests a sleeve 37, which may be retained by a collar 38 engaging over a shoulder 39 of the sleeve, and secured to the yoke. The upper portion of the stem may be threaded through the sleeve at 40. A handwheel 41 or the like may be keyed to the sleeve 37 at 42, and a nut or collar 43 may be connected over the free end of the sleeve. By turning the hand-wheel, the sleeve is rotated so as to raise or lower the stem for opening or closing the gate.

For lubricating the thread 40 of the stem, a lubricant passage 43a may be drilled through the hub of the handwheel and the adjacent cup 44, or the like may be connected to said passage.

For lubricating the seat 36, a lubricant passage 45 is formed in the upper part of the yoke, in communication with the seating surface 36. A source of lubricant, such as a grease cup 46 may be connected to said passage. Hence it will be seen that the sleeve is thoroughly lubricated at all points, and, moreover, the grease tends to be retained at the sliding surface of the sleeve. Consequently, despite the considerable weight of the gate and its extension, in large installations, the operation of opening and closing the gate is greatly facilitated.

For supplying lubricant to the gate extension 24, so as to avoid undue wear on the packing 31, and also to assure positive tightness of the joint, I provide an improved lubricant supply and means of distributing the same. Preferably, a distributing element such as a grease cage 47 is disposed in such association with the packing so that the packing tends to retain the lubricant for proper distribution. While the grease cage may be made in widely varying forms, it is sufficient to construct it of continuous form to extend around the gate extension, and of substantially I form in cross section. The web 48 of the I beam may be formed with openings 49 so that lubricant may flow through the surface of the gate extension. The packing 30 may be disposed in sections 50 and 51 above and below the grease cage, and compressed against the flanges thereof. Since the I beam is strong, and may be made of metallic one piece construction, it is easily retained between the packing sections, and out of any substantial contact with the gate extension.

To supply lubricant to the grease distributor 47, an opening 52 may be formed in the wall of the extending casing, and a lubricant supply 53 connected therewith as by a tube 54. The lubricant will thus enter the space between the flanges of the cage and flow along the same through the holes 49 to uniformly thoroughly lubricate the gate extension.

In order to lubricate the seating surface of the gate 14, a plurality of annular alined grooves 55 may be provided in the faces of the seats 15. It is desirable to assure a relatively uniform distribution of lubricant thereto, since these grooves may accumulate some solid materials which may tend to hinder the flow of lubricant along the grooves. Hence a plurality of angularly spaced lubricant inlets 56 are provided for each groove, these inlets being as close together as may be practical. Passages 57 through the casing 11 extend to these inlets and a common conduit may be provided for all the passages on one side of the valve. Preferably this conduit may be in the nature of a manifold 58, and tubes 59 may be connected thereto in any suitable manner, as by union fittings 60, the other ends of the tubes being press fitted, welded or otherwise connected with the passages. For assembly and passing over the connecting flanges 61 of the casing 11, the manifolds may be split and their ends interconnected by unions 62.

To supply lubricant to the manifold 58, each of them may have a T fitting 63 to which is connected a lubricant pressure device or container 64, and a check valve 65 being interposed to prevent any fluid under pressure from accidentally entering said container.

In Figs. 3 and 4 is shown a modified means 66 for affording a uniformly distributed supply of lubricant to the seating surface of the gate. The same may include an internal continuous conduit 67 to which lubricant is supplied through a passage 68. Communicating with the conduit 67 are a plurality of spaced openings 68a, which terminate in a continuous groove 69, similar to groove 55, at the seat 70 of the gate. A simplified form of making this construction may consist in the provision of a ring member 71 having the seat 70 and in which certain of said lubricant passages are formed. This may provide a renewable seat and may be secured to the casing 11a in any feasible manner by threaded means for drawing the ring tight to the casing, as, for example, by a thread 72.

In Fig. 5 is shown a further modification 73 for the uniform distribution of lubricant to the gate seat. This may include a relatively large channel or groove 74 formed in the casing 11b. One or more plates 75, 76 co-operate with the channel to form a relatively narrow lubricant passage 77. The inner edges of the opening 77 may be beveled as shown for smooth contact with the gate. The plate means 75, 76 are preferably in the same plane and may be smooth and uniform for effective closure with the gate. It may also be backed with pliable sealing strips 76a. The plate means may be secured in any suitable manner, as by countersunk screws 78. This renewable seat need require little or no machining to afford a smooth seat, and can be removed without affecting the operation of the valve, although a larger amount of lubricant will be supplied.

In Fig. 9 is shown a modification for causing a discharge of lubricant to the seating surface in a partially tangential direction to cause a more effective distribution of the lubricant in a construction such as shown, for instance, in Fig. 1. Thus, at the upper portion of the gate seat, passages 79 laterally angularly spaced with respect to the vertical central plane of the seat discharge into the lubricant groove 80 at points 81. This causes the lubricant to follow down along the groove instead of merely overflowing the same.

It will be appreciated that various changes and modifications may be made in the device as shown in the drawing, and that the same is submitted in an illustrative and not in a limiting sense, the scope of the invention being defined in the following claims.

It will be understood that the flow of lubricant may in each case be caused by manually or automatically controlled devices, under pressure or gravity feed, and that such flow may be continuous or discontinuous, and in the case of the gate seats, may occur mainly during closure of the gate.

I claim:

1. A device including a gate member, a casing member, one of said members having plane plate means of sheet material to provide a seating surface therebetween, the member having the plate means having a lubricant passage, said plate means overlying said passage and having an opening restrictedly communicating with said passage to supply lubricant to the seating surface.

2. A device including a valve member, a casing member, one of said members having a lubricant groove, a plurality of concentric ring elements annularly spaced from each other and connected to the member having the groove so as to overlie the latter and provide a restricted annular opening, and said members having seating surfaces lubricated by lubricant passing from the groove through said restricted opening to the seating surfaces.

3. A device including a wedge valve, a casing, said casing having seats extending along planes parallel to the faces of the valve, said casing having lubricant supply grooves extending along said seats, and plates of thin sheet material removably secured to said seats to afford valve seating surfaces parallel to the faces of the valve, said plates partially overlying said grooves to afford restricted communication of the grooves with the said valve seating surfaces, whereby the wedge valve is adapted to engage said seating surfaces and to move into engagement with the first mentioned seats upon removal of said plates, and with the grooves adapted to supply lubricant to the first mentioned seats.

FRED E. RILEY.